UNITED STATES PATENT OFFICE.

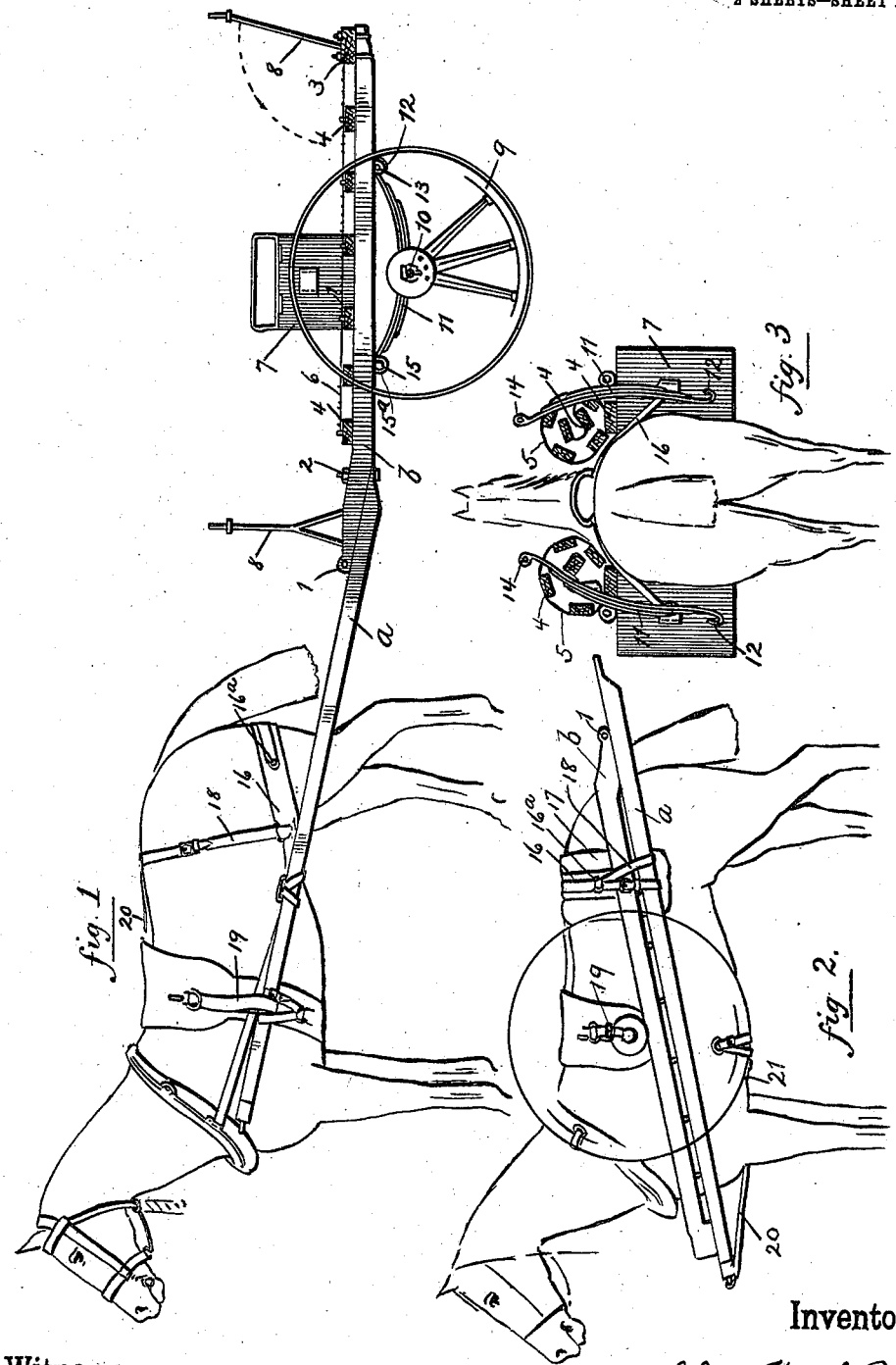

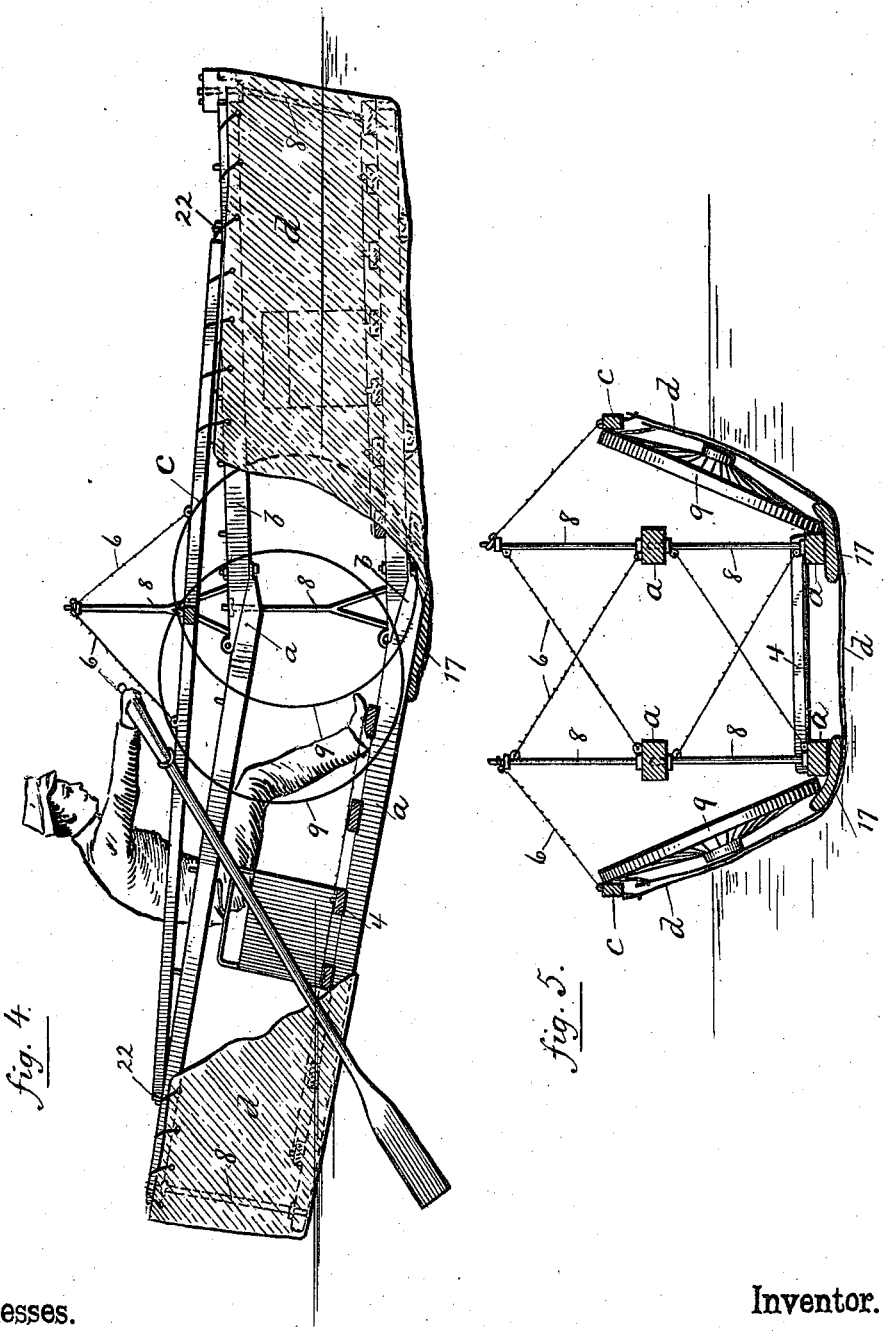

JOHAN HENRIK RYE, OF CHRISTIANIA, NORWAY.

CART.

963,252.  Specification of Letters Patent.  Patented July 5, 1910.

Application filed November 4, 1908. Serial No. 461,017.

*To all whom it may concern:*

Be it known that I, JOHAN HENRIK RYE, captain in the Norwegian cavalry, a subject of the King of Norway, residing at Christiania, Norway, have invented certain new and useful Improvements in Carts; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My invention relates to a knock-down structure for constructing foldable and convertible carts and has for its object in addition to providing a light and portable cart, the provision of means whereby two of the carts may be readily converted into a skiff or boat.

To these ends the invention consists in providing shafts composed of two parts hinged together to permit folding and when extended one of said parts inspans the horse while the other part forms a portion of the cart body or the two parts in conjunction with similar shafts form a boat frame over which a canvas covering is stretched.

The invention further consists in securing to the shafts suitable brackets designed to serve as guards on the cart and also serve as braces to form the boat frame.

In the accompanying drawings, Figure 1 is a side view of my improved cart assembled with a horse inspanned. Fig. 2 illustrates the manner in which the folded shafts and wheel are panniered on the back of a horse. Fig. 3 illustrates the manner in which the remaining parts of two carts are panniered on the back of a horse. Fig. 4 is a side view of a boat constructed of the parts of two carts, a portion of the outer covering being broken away, and Fig. 5 is a cross section of the same.

In constructing a cart as shown in Fig. 1 I provide two shafts formed of two pieces *a* and *b* the portions *a* of which serve to inspan the horse and the portions *b* forming the side members of the cart. The part *a* is preferably made straight, and to permit the part *b* to normally lie horizontal the front end of the latter is formed at an angle to the main portion and rests on the part *a*, said parts being connected together by means of a hinge 1, on the front end of the part *b*, and a bolt 2 passing through the rear end of the part *a* and the part *b* behind the hinge. The two shafts are connected together at the rear by a cross piece 3, bolted to the parts *b*, and resting on the latter is a load support consisting of a plurality of cross slats 4 flexibly connected together by a strip of canvas, or by leather straps 5 as preferred, and connected to the parts *b* by wire ropes 6 which also secure a box seat as 7, to the slats.

Projecting upward from the front ends of the parts *b* and from the rear cross piece 3 are brackets 8 which serve as guards for bundles and the like carried on the cart, and as braces to rigidly connect the frame of the boat, as will be hereinafter described.

The cart is provided with two wheels, as 9, journaled on an axle 10, detachably mounted in springs 11, one of which is detachably connected to each part *b* of the shafts. The preferred form of connecting the spring to the shaft is by forming a hook 12 on one end of the spring which hook takes over a bolt mounted in a bracket 13 fixed on the shaft, while in the other end of the spring is formed an eye 14 through which passes a bolt 15 in a bracket 15ª on said shaft.

To fold the cart the rear cross-bar 3 is detached and the cart bottom together with the box seat are removed. By removing the bolt 15, the springs may be unhooked from the bracket 13, the wheels removed from the axle and the latter from the springs. The parts of two carts with the exception of the wheels are panniered upon the back of one horse as shown in Fig. 3. By loosening the bolt 2, the part *b* may be folded onto the part *a* which latter is released from the breeching-strap 16 and pushed forward as shown in Fig. 2. The driver's cushion as 17 may be laid upon the horse and the breeching 16 laid on the cushion, taking the place of the hip strap 18 which latter is passed around the shafts and connected by a buckle 16ª to the breeching. The wheels are held by the saddle straps 19 while the crupper 20 is connected to the belly-band 21 and fastened to the front end of the shafts to prevent them from tilting upward.

In constructing a skiff or boat as shown in Figs. 4 and 5, two pairs of extended shafts are used, one pair above the other, each superposed pair being connected by means of the brackets 8. The bracket of one shaft passes through and is bolted to the shaft above it at the center and at both ends, and the cross pieces 3 connect the shafts in pairs at the stern. The gunwales, as $c$, are provided which are tenoned into mountings 22 and are connected to the brackets by the wire rope 6, which rope also connects the shafts and brackets, as shown in Fig. 5. A canvas cover $d$ is laced to the gunwales and to the upper shafts, and to protect the covering against the wear of the shafts the cushions 17 are interposed between the shafts and covering. The flexibly connected slats 4 are mounted on the shafts, the same as in the cart, forming a suitable bottom for the boat, and the wheels may be placed against the sides of the boat and the latter readily converted into a cart upon landing.

I claim—

A knock-down structure of the character described, comprising side members formed in two parts, one of said parts having an angular end portion, a cross-piece to connect said members in pairs, a floor detachably connected to the latter, wheels detachably connected with said side members and brackets on the latter whereby two pairs of the members may be superposed, for the purpose specified.

In testimony that I claim the foregoing as my invention, I have signed my name in presence of two subscribing witnesses.

JOHAN HENRIK RYE.

Witnesses:
HENRY BORDEWICH,
M. ALGER.